United States Patent
Bertram

[15] 3,686,358
[45] Aug. 22, 1972

[54] GLYCIDYL ETHERS OF HALONEOPENTYL GLYCOLS

[72] Inventor: James L. Bertram, 115 Southern Oaks Dr., Lake Jackson, Tex. 77566

[22] Filed: April 12, 1971

[21] Appl. No.: 133,397

Related U.S. Application Data

[63] Continuation-in-part of Ser. No. 837,351, June 27, 1969, abandoned.

[52] U.S. Cl..........260/830 TW, 260/2 EP, 260/2 EN, 260/47 EP, 260/47 EN, 260/83 OR
[51] Int. Cl. ............................................C08g 45/04
[58] Field of Search ......59/12, 98 OC; 60/10, 874 C; 66/3, 414 S; 260/2 EP, 830 TW

[56] References Cited

UNITED STATES PATENTS

| | | | |
|---|---|---|---|
| 3,016,362 | 1/1962 | Wismer | 260/830 TW |
| 3,355,511 | 11/1967 | Schwarzer | 260/830 TW |
| 3,506,736 | 4/1970 | Najvar | 260/835 |
| 3,523,037 | 8/1970 | Chellis | 260/830 TW |

FOREIGN PATENTS OR APPLICATIONS 1,083,939   9/1967   Great Britain

OTHER PUBLICATIONS

E. M. Blyakhman Kakokrasochnye Materialy i ikh Primenenie 1963 (6) 7– 10.

*Primary Examiner*—Paul Lieberman
*Attorney*—Griswold & Burdick, Raymond B. Ledlie and James G. Carter

[57] ABSTRACT

This invention relates to glycidyl ethers of haloneopentyl glycols which have low viscosity and which are curable into fire retardant resins having improved physical properties. These glycidyl ethers are prepared by reacting a haloneopentyl glycol with an epihalohydrin in the presence of a Lewis acid catalyst and reacting such reaction product with a strong base to produce terminal epoxidation.

10 Claims, No Drawings

GLYCIDYL ETHERS OF HALONEOPENTYL GLYCOLS

This application is a continuation-in-part of my copending application Ser. No. 837,351, filed June 27, 1969 now abandoned.

This invention relates to new glycidyl ethers of haloneopentyl glycols, to the cured resins prepared therefrom and to a process for the preparation of such ethers. The halogenated glycidyl ethers of this invention have low viscosity and the cured resins prepared therefrom have fire retardant characteristics and improved physical properties.

In the field of epoxy resins, it is recognized that most di and polyglycidyl ethers are either very high viscosity liquids or solids and this property renders such materials unsuitable for many purposes. The halogenated epoxy resins find utility as fire retardant resins but these materials are even more viscous than their non-halogenated analogues. In general, the halogenated aliphatic polyglycidyl ethers have the further disadvantage of not possessing adequate fire retardant properties. In order to overcome the problems of viscosity, a mono-functional diluent is frequently employed but such diluents reduce the physical properties of the cured resin. For vacuum casting operations, where the monofunctional diluents frequently vaporize, difunctional, non-halogenated reactive diluents are sometimes employed because of their lower viscosity. Due to the proportion of such diluents which is usually required, however, the halogen content of the cured resin systems is reduced thereby reducing the flame retardant or self-extinguishing characteristics of the cured resin system. A diglycidyl ether is needed therefore which has a low viscosity and which is curable into a flame-retardant or self-extinguishing resin having good physical properties.

It is an object of this invention to provide to the art new low viscosity halogenated epoxy resins. A further object is to provide to the art a process for the preparation of such resins. A still further object is to provide to the art the glycidyl ethers of haloneopentyl glycol and cured resins prepared therefrom. These and other objects and advantages of the present process will become apparent from a reading of the following detailed description.

It has now been discovered that a new class of glycidyl ethers may be prepared which possess novel properties making them particularly suitable for curing into flame retardant epoxy resins. Such novel glycidyl ethers have the general formula

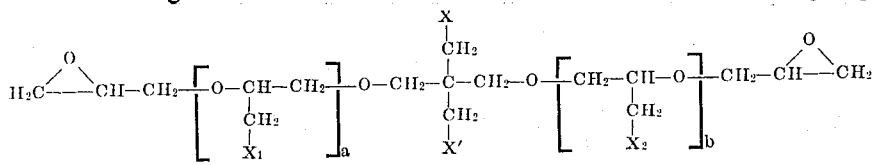

wherein X is selected from the group consisting of hydrogen, chlorine or bromine radicals, X', $X_1$ and $X_2$ are independently selected from chlorine and bromine radicals and $a$ and $b$ are integers the sum of which is from 0 to about 6. These glycidyl ethers have a low viscosity, a relatively high halogen content and provide self-extinguishing properties, good elastic and impact characteristics when cured to a solid resin. These resins find particular utility in wet lay-up and casting applications wherein fire retardancy is desirable.

Those compositions represented by the above formula and wherein X and X' are both bromine are particularly advantageous and are therefore preferred for many applications.

Compounds of the present invention, represented by the following formula, when mixed with non-halogen-containing polyepoxide resins provide an improvement in the physical properties of the cured mixture of polyepoxides as compared to cured mixtures of non-halogen-containing aromatic based polyepoxides and bromine-containing aromatic based polyepoxides.

The formula referred to above is as follows:

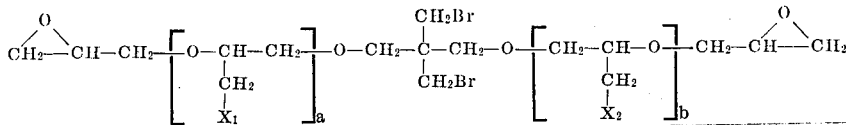

wherein $a$, $b$, $X_1$ and $X_2$ are as previously defined.

The preferred compositions are mixtures of compounds represented by the above formula wherein the sum of $a$ and $b$ is about zero and the non-halogen containing polyepoxide is a glycidyl ether of a polyhydric aromatic compound such as the bisphenols, resorcinol, hydroquinone, novolac resins and the like. The bromine content is preferably at least about 18 percent by weight of the composition including the weight of fillers, modifiers, other fire retardant components and the like.

The preferred composition of the present invention may also include minor amounts of a brominated-aromatic polyepoxide resin, particularly a brominated polyglycidyl ether of a polyhydroxyl-containing aromatic compound such as tetrabromo bisphenol A. When such minor amounts of said bromine-containing glycidylether of polyhydroxyl-containing aromatic compound is employed, it is employed so as to contribute up to about 40 percent and preferably up to about 25 percent by weight of the bromine content contained in the total composition wherein such a composition contains a minimum of about 18 percent by weight of bromine.

The improved physical properties are those properties including one or more of the group including tensile strength, flexural strength, flexural modulus and percent elongation.

The compositions of this invention are prepared by reacting neopentyl glycol or a bromo, chloro, or bromo-chloro neopentyl glycol with an epihalohydrin such as, for example epichlorohydrin, epibromohydrin or mixtures thereof in the presence of anhydrous stannic chloride. When the reaction is complete, the product is reacted with caustic or other suitable base to produce terminal epoxidation.

In the first reaction step, an epihalohydrin is reacted with neopentyl glycol, monobromoneopentyl glycol, dibromoneopentyl glycol, dichloroneopentyl glycol or bromochloroneopentyl glycol in the presence of a catalyst such as anhydrous stannic chloride. A mole ratio of epihalohydrin to glycol OH of greater than about 1 is employed to prevent the formation of objectionable proportions of monofunctional products and a ratio of about 1.1 to about 1.25 moles of epihalohydrin per mole of OH is usually preferred. It is likewise convenient to conduct the reaction in an inert diluent such as ethylene dichloride or benzene. The proportion of such diluent is not critical but from about 90 to about 40 percent by weight based on the glycol content of the mixture has been found to be advantageous. Although ethylene dichloride and benzene are the preferred diluents, any diluent which is inert to the reactants and resulting products may be employed in the preparation of the glycidyl ethers of haloneopentylglycols of this invention. Other suitable diluents include, for example, methylene chloride, 1,1,1-trichloroethane, 1,4-dichloropropane, chloroform, chlorobenzene, xylene, toluene, hexane, cyclohexane and the like.

Lewis acid catalysts such as, for example, stannic chloride, boron trifluoride, stannous chloride, stannic chloride pentahydrate, zinc chloride and the like, can be employed to produce the glycidyl ethers of haloneopentyl glycols of this invention, but anhydrous stannic chloride is greatly preferred because of its much higher selectivity. The stannic chloride catalyst or other Lewis acid catalyst can be employed over a wide range of concentrations without adversely affecting the reaction but a concentration of from about 0.001 to about 0.1 moles per mole of glycol-OH is particularly suitable.

Reaction between the glycol and epihalohydrin is conducted at a temperature of from about 0° C. to the reflux temperature of the mixture, but from 40° to about 100° C. is usually preferred. At these temperatures the reaction is usually complete in from 15 to 30 minutes.

After completion of the coupling reaction between the epihalohydrin and the glycol, a strong base, such as NaOH, is added to the reaction mixture. It is desirable to employ the base as a 10–50 percent aqueous solution but the concentration is not critical. At least one equivalent of base is employed per OH in the reaction product but no particular advantage is obtained by employing more than about 2 equivalents of base per OH group.

Reaction between the base and the glycol-epihalohydrin adduct to produce epoxidation is conducted at a temperature of between about 20° and the reflux temperature of the reaction mixture with a temperature of from 40° C. to such reflux temperature being usually preferred. Where a non-aqueous inert diluent, such as ethylene dichloride, has been employed in the glycolepichlorohydrin reaction step, the water from the epoxidation step may be removed by azeotropic distillation and the salt removed by filtration. Alternatively, the salt may be removed by water washing of the epoxidized product and final purification may then be achieved by distillation, preferably at reduced pressure.

The glycidyl ether products produced by the above-described reaction are clear liquids having a Gardner color of about 5 or less, a viscosity of from about 100 to about 300 cps at 250° C., an epoxide content of from about 15 to about 30 percent, and an average molecular weight of from about 285 to about 1,000. Such products have a total halogen content of from about 25 to about 54, with a bromine content of from about 0 to about 54. Variations in viscosity, epoxide content, halogen content and molecular weight within the above ranges are achieved by selection of the reactants and variations in the ratio of the reactants.

By employing the above-described reaction, a product is produced which is predominantly a diglycidyl ether of halo-neopentyl glycol. It is to be recognized, however, that the product is usually a mixture of materials falling within the scope of the formula shown above. In addition, the product frequently contains a relatively small proportion of the monoglycidyl ether of haloneopentyl glycol but even when these monofunctional products are produced they are not present in a sufficient proportion to adversely affect the properties of the product.

The diglycidyl ethers of haloneopentyl glycol of this invention are cured in the same manner as other epoxy resins, i.e. these products are cured to solid, cross-linked, thermoset resinous bodies with di or polyfunctional amines such as, for example, diethylene triamine, triethylene tetramine, methylene dianiline, and the like, acid anhydrides such as, for example, nadic methyl anhydride and the like and aziridines, polyamides, thiols, ketimines and the like.

In order to modify the properties of the cured resins, the glycidyl ethers of this invention may be admixed with other known di and polyglycidyl ethers such as epoxidized novolacs having a functionality greater than 2, the diglycidyl ethers of a bisphenol such as, for example, p,p'-isopropylidenediphenol, the diglycidyl ethers of a polyhydroxy aromatic compound such as, for example, resorcinol, catechol and the like. Particularly desirable mixtures are those mixtures which contain a sufficient quantity of the resin of the present invention so as to provide the resultant mixture with at least about 18 percent bromine by weight.

The thermoset products produced from the glycidyl ethers of the haloneopentyl glycols of this invention possess good physical properties and in most instances, the flexural strength, flexural modulus and tensile strength properties are greater than from those resulting from thermoset glycidyl ethers of non-halogenated neopentylglycol.

The thermoset products produced from the glycidyl ethers of the haloneopentyl glycols of this invention are fire retardant and usually self-extinguishing when tested according to ASTM D635–56T.

The following examples are provided to further illustrate the invention and to show certain embodiments in greater detail. Such examples are not to be construed as limiting to the scope of the invention, however.

EXAMPLE 1

A reaction vessel was charged with 130.5 gm (0.5 mole) of dibromoneopentyl glycol, 2.6 gm (0.01 mole) of stannic chloride and 196.0 gm of ethylene dichloride (EDC). The mixture was agitated, heated to 80° C. and 102.0 gm (1.10 moles) of epichlorohydrin was added over a period of about 1 hour while the temperature was maintained between 75°–80° C. After addition of the epichlorohydrin, the reaction mixture was digested at 75° C. for 30 minutes. To the digested mixture was added 61.6 gm (1.54 moles) of NaOH as a 20 wt. % aqueous solution and heating at 70° C. was continued for 5.5 hours. At the end of this time, the reaction mixture was cooled, the organic and aqueous phases were separated and the organic phase was washed with water until it became substantially neutral. The neutralized organic mixture was then distilled under reduced pressure to remove the EDC therefrom. A yield of 95 percent of theoretical was obtained of a clear liquid product having the following properties:

Gardner color — 1
Viscosity at 25° C.—280 cps.
Density at 25° C.—1.56
% epoxide—16.35
% bromine —38.0
% total chloride —4.50

Portions of the above prepared diglycidyl ether of dibromoneopentyl glycol were cured with 19 phr of methylenedianiline at 55° C. for 16 hours, 2 hours at 125° C. and 2 hours at 175° C. The resultant thermoset, solid, infusible product had the following properties:

| | |
|---|---|
| Heat distortion temperature | 53°C |
| Flexural Strength | 14,400 psi |
| Flexural Modulus | $5.0 \times 10^5$ psi |
| Tensile Strength | 9,600 psi |
| Elongation | 3.4% |
| Flammability (time to flame-out)- self extinguishing | 1 sec. |

EXAMPLE 2 — COMPARATIVE

For comparative purposes, a resin was prepared in a manner similar to Example 1 except that neopentyl glycol was employed instead of dibromoneopentyl glycol, the reaction with epichlorhydrin was conducted at 60° C., the epoxidation was conducted at 70° C. for 3½ hours and the diluent employed was benzene.

The product had an epoxide of 31.4 percent and a viscosity of about 14 centipoises at 25° C.

A portion of this resin was cured as in Example 1 and was found to possess the following properties.

| | |
|---|---|
| Flexural Strength | 8,486 psi |
| Flexural modulus | $3.87 \times 10^5$ psi |
| Tensile strength | 6,938 psi |
| Elongation | 6.0% |
| Flammability | burned |

EXAMPLE 3

Experiment A — (An example of the present invention):

A mixture consisting of the following recipe and having a bromine content of 19.2 percent was cured at 55° C. for 19 hours, at 125° C. for 2 hours and finally at 175° C. for 2 hours.

RECIPE A 200 grams of the diglycidyl ether of dibromoneopentyl glycol having a percent epoxide of 16.35.
125 grams of the diglycidyl ether of bisphenol A having an epoxide equivalent weight of about 189.
71 grams (1 amine hydrogen equivalent per epoxy equivalent) of methylenedianiline.

Experiment B — (A comparative experiment):

A mixture consisting of the following recipe and having a bromine content of 19.2 percent was cured under conditions identical to Experiment A above.

RECIPE B 150 grams of the diglycidyl ether of tetrabromobisphenol
150 grams of the diglycidyl ether of bisphenol A
60 grams (1 amine hydrogen equivalent per epoxy equivalent) of methylenedianiline.

Test specimens were prepared from each of the products obtained from experiments A and B above and physical properties determined thereon. The results are given in the following table.

| | Experiment No. | |
|---|---|---|
| | A | B |
| PROPERTY | Present invention | Comparative |
| Heat distortion temp., °C | 82 | 156 |
| Tensile strength, psi | 11,200 | 9,400 |
| Fire resistance: ASTM 635-56T | | |
| Time to extinguish, sec. | 2.5 | 2.5 |
| Flexural Strength, psi | 18,500 | 16,600 |
| Flexural modulus, psi × $10^5$ | 4.7 | 4.3 |
| Elongation % | 6.0 | 3.0 |

The above data clearly demonstrates that the strength and elongation properties of the cured composition represented by Experiment A are greater than those represented by Experiment B.

I claim:

1. An epoxy resin composition which when admixed with a curing agent is curable to a fire retardant composition which comprises a mixture of
   A. a non-halogen-containing aromatic based polyepoxide and
   B. a polyepoxide having the formula

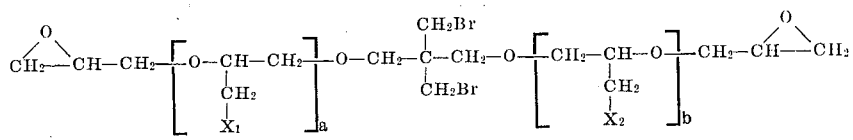

wherein $X_1$ and $X_2$ are independently selected from chlorine and bromine, $a$ and $b$ are integers the sum of which is from about 0 to about 6; and wherein said composition contains at least about 18 percent by weight of bromine.

2. The composition of claim 1 wherein the sum of $a$ and $b$ is zero.

3. The composition of claim 2 wherein component (A) is a polyglycidyl ether of a bisphenol.

4. The composition of claim 2 wherein component (A) is a polyglycidyl ether of a novolac resin.

5. An epoxy resin composition which when admixed with a curing agent is curable to a fire retardant composition which comprises a mixture of
A. a non-halogen-containing aromatic based polyepoxide,
B. a polyepoxide having the formula

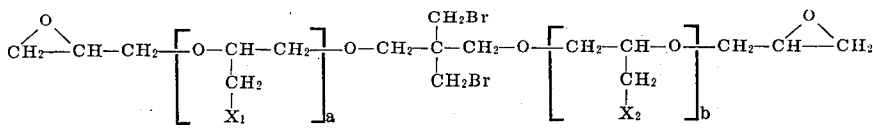

wherein
$X_1$ and $X_2$ are independently selected from chlorine and bromine, $a$ and $b$ are integers the sum of which is from about 0 to about 6,
C. a brominated polyglycidyl ether of a brominated polyhydroxyl-containing aromatic compound, wherein said composition contains at least about 18 percent by weight of bromine and wherein from about 60 to about 100 percent of the bromine content is derived from component B and from 0 to about 40 percent by weight of bromine is derived from component (C).

6. The composition of claim 5 wherein the sum of $a$ and $b$ is zero.

7. The composition of claim 6 wherein component (A) is a polyglycidyl ether of a bisphenol and component (C) is present in a quantity sufficient to provide up to about 25 percent by weight of the bromine content of the composition.

8. The composition of claim 7 wherein component (C) is the diglycidyl ether of tetrabromobisphenol A.

9. The cured composition of claim 1.

10. The cured composition of claim 5.

* * * * *